Patented June 30, 1953

2,644,010

UNITED STATES PATENT OFFICE 2,644,010

SALTS OF d-AMIDONE WITH AN OPTICALLY ACTIVE ACID AND PROCESS FOR RESOLVING dl-AMIDONE

Eugene E. Howe, Bound Brook, and Max Tishler, Westfield, N. J., assignors to Merck & Co., Inc., Rahway, N. J., a corporation of New Jersey No Drawing. Application October 24, 1947,
Serial No. 782,016

6 Claims. (Cl. 260—501)

This invention is concerned with the resolution of dl-amidone into its individual stereoisomers; more particularly it relates to an improved process for preparing l-amidone in pure form and in excellent yield from the corresponding racemate.

dl-Amidone, which was developed by the German scientists prior to and during the war, has proved to be an important analgesic and morphine substitute. The toxicity of dl-amidone, however, has presented a serious problem in the use and administration of the drug. It is known that this toxicity can be minimized by employing the l-form alone, since it is l-amidone which is active as an analgesic, whereas both l-amidone and dl-amidone seem to have the same toxicity.

The term "amidone" is commonly used to designate the chemical compound, 2-dimethylamino - 4,4 - diphenyl - heptanone - 5, having the formula:

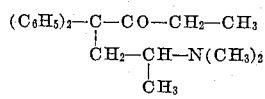

The resolution of dl-amidone has been accomplished previously by reacting the mixture of stereoisomers with d-tartaric acid in isobutyl alcohol and crystallizing l-amidone d-tartrate from the resulting mixture. This method suffers from the disadvantage that a long crystallization time (14 days) is required to effect separation of the l-amidone d-tartrate. Moreover, the yield of l-amidone by this process has been limited to about 25% of theory.

It is now discovered that this excessive crystallization time can be avoided and that l-amidone can be prepared from dl-amidone in substantially pure form and in a yield of 80%, or more, of that theoretically obtainable. This is accomplished by removing substantially all of the d-amidone from the dl-mixture as a sparingly soluble salt with one optically active acid, such as α-bromocamphor-π-sulfonic acid, p-nitrobenzoyl-L-glutamic acid and the like; and purifying the residual impure l-amidone by fractional crystallization of its salt with a different optically active acid, such as d-tartaric acid.

In carrying out our novel and improved process, we can react a salt of dl-amidone, such as dl-amidone hydrochloride, with a salt of the optically active acid, as for example ammonium α-bromocamphor-π-sulfonate, or, if preferred, by reacting dl-amidone base directly with the desired optically active acid, to form a mixture of salts of said optically active acid with the amidone stereoisomers.

This mixture of salts of d- and l-amidone with the optically active acid is conveniently prepared by reacting the components in solution in a lower aliphatic alcohol, such as methanol, ethanol, butanol and the like. Said mixtures of salts are then separated from each other by fractional crystallization from the alcoholic reaction solution.

For example, when dl-amidone or a salt thereof is heated in aqueous ethanol with at least one molecular equivalent of a α-bromocamphor-π-sulfonic acid or a salt thereof, there is obtained an ethanolic solution containing a mixture of d- and l-amidone α-bromocamphor-π-sulfonates. Upon cooling this solution and adding water thereto, substantially all of the d-amidone α-bromocamphor - π - sulfonate precipitates and is readily separated by filtration or centrifugation from the mother liquor containing the corresponding salt of l-amidone. If, instead of employing one or more equivalents of the sulfonic acid compound, the dl-amidone, or salt, is treated with one-half its molecular equivalent of α-bromocamphor-π-sulfonic acid, or salt, and the reaction solution subjected to fractional crystallization, substantially all of the d-amidone is precipitated as the α-bromocamphor-π-sulfonate. This salt contains essentially all of both the d-amidone and the sulfonic acid compound originally present in the solution. The mother liquor, which contains the l-amidone, is, therefore, essentially free of α-bromocamphor-π-sulfonic acid.

When p-nitrobenzoyl-L-glutamic acid is employed as the resolving agent, it has been found convenient to react dl-amidone directly with the p-nitrobenzoyl-L-glutamic acid. This reaction is ordinarily conducted by heating the reactants in butanol solution. Upon cooling the reaction solution and diluting with petroleum ether, substantially all of the d-amidone precipitates as the p-nitrobenzoyl-L-glutamate. The mother liquor contains substantially all of the l-amidone essentially free of the dextrorotatory isomer.

The mother liquor containing the l-amidone salt is treated with an alkaline substance, such as, for example, sodium hydroxide, ammonium hydroxide, and the like, thereby precipitating the crude l-amidone.

The crude l-amidone is isolated by conventional means and is then reacted with d-tartaric acid and the l-amidone d-tartrate thus obtained, purified by fractional crystallization from a solvent. It is ordinarily preferred to conduct the reaction by heating the reactants together in butanol. The resulting butanol solution is then cooled, thereby crystallizing the l-amidone d-tartrate in substantially pure form.

The l-amidone is recovered from its salt with d-tartaric acid by conventional means, as for example, by treatment with aqueous sodium hydroxide thereby forming a precipitate of the water-insoluble l-amidone. The l-amidone is recovered by filtration and washed with water and dried. If desired, the l-amidone can be readily converted by treatment with acids, to salts, such as l-amidone hydrochloride, convenient for therapeutic use.

The following examples illustrate a method of carrying out the present invention, but it is to be understood that these examples are given for purposes of illustration and not of limitation.

*Example 1*

About 10 g. (.029 mole) of dl-amidone hydrochloride and about 5 g. (.015 mole) of ammonium α-bromocamphor-π-sulfonate are dissolved by heating in an alcoholic solvent containing about 20 cc. of ethanol and about 5 cc. of water. The resulting solution is cooled to approximately room temperature (25° C.) and about 220 cc. of water are added slowly to the cooled solution thereby precipitating the impure salt of d-amidone. The mixture is cooled and maintained at about 0–5° C. overnight, and filtered. The collected salt is washed twice with ice water and dried at 45° C. to produce approximately 7.6 g. of crude d-amidone α-bromocamphor-π-sulfonate, M. P. 125–127° C.; yield approximately 85% of theory. Recrystallization of this product from aqueous ethanol yields about 6.5 gms. (85% recovery yield) of substantially pure d-amidone α-bromocamphor-π-sulfonate, M. P. 135–138° C.

The mother liquors and washes from the preparation of pure d-amidone α-bromocamphor-π-sulfonate are combined and treated with about 5 cc. of 40% aqueous sodium hydroxide solution. The amidone precipitates immediately, the resulting slurry is allowed to stand at 0–5° C. overnight, and the resulting precipitate is collected, washed twice with water and dried at 45° C. to produce approximately 5.7 gms. of crude l-amidone; M. P. 83–85° C.

This product and about 2.4 gms. of d-tartaric acid are dissolved in about 35 cc. of hot N-butanol. The resulting solution is cooled and seeded with l-amidone tartrate whereupon a heavy precipitate forms, and the resulting slurry is maintained at room temperature for approximately 2 hours. About 35 cc. of petroleum ether is then added, the mixture is refrigerated overnight, and the l-amidone-d-tartrate is recovered by filtration. The crystalline product is washed once with 70 cc. of 1:1 butanol-petroleum ether and twice with 70 cc. portions of petroleum ether, and dried at 45° C. to produce approximately 5.9 gms. of substantially pure l-amidone tartrate; M. P. 149–150° C.; yield approximately 86.5% of theory.

Said l-amidone tartrate (5.9 gms.) is dissolved in approximately 35 cc. of water, and about 6 cc. of 20% aqueous sodium hydroxide is added to the solution, whereupon a heavy precipitate forms. The mixture is refrigerated overnight, filtered and the crystalline product washed twice with water and dried to produce approximately 3.95 gms. of substantially pure l-amidone; M. P. 98–100° C.; recovery yield from l-amidone tartrate 99.5% of theory.

About 26 gms. of l-amidone, prepared substantially as described above, is dissolved in about 70 cc. of absolute ethanol, and about 8.2 cc. of concentrated aqueous hydrochloric acid is added to the solution. The resulting solution is heated to boiling, filtered through a thin mat of activated charcoal (Darco), and the charcoal mat washed with approximately 15–20 cc. of hot ethanol. The aqueous ethanolic filtrate is allowed to cool slowly to room temperature, after which approximately 275 cc. of ether is slowly added. The resulting mixture is placed in the icebox overnight, and then filtered. The insoluble crystalline product is washed with two 50 cc. portions of ether and dried at 45° C. to produce approximately 27 gms. of substantially pure l-amidone hydrochloride; M. P. (in oil bath) 237–239° C.; (on electrically heated block) 245–246° C.; yield approximately 93% of theory.

*Example 2*

About 2.6 g. of dl-amidone and about 2.6 g. of p-nitrobenzoyl-L-glutamic acid are dissolved in about 13 cc. of boiling butanol, and the solution is cooled to approximately 20° C. One to 3 cc. of petroleum ether (B. P. 30–60° C.) is added to this solution over a period of 5 minutes (or longer if necessary to insure formation of seed crystals). The resulting mixture is then cooled to approximately 0° C., and an additional 12 cc. of petroleum ether is added over a 2-hour period. The crystalline slurry thus formed is allowed to stand overnight at approximately 0° C., after which the crystalline salt is removed by filtration, washed with two 25 cc. portions of a 1:1 petroleum-ether-butanol mixture, and dried at 50° C., to produce about 2.9 g. of d-amidone p-nitrobenzoyl-L-glutamate.

The mother liquors from the d-amidone salt are evaporated to dryness and the residual material dissolved in about 10 cc. of water. About 7 cc. of 10% aqueous sodium hydroxide solution is added to this solution with agitation, and the resulting mixture is maintained at approximately 0° C. overnight. The material which precipitates is recovered by filtration, washed with three 25 cc. portions of ice water, and dried at 50° C. to produce approximately 1.2 g. of crude l-amidone; M. P. 83–88° C.

The crude l-amidone, prepared as described above, is converted to l-amidone-d-tartratem and subsequently to pure l-amidone, substantially as described in Example 1. The l-amidone-d-tartrate thus obtained shows a specific rotation $[\alpha]_D^{25}$ (2% in water) = $-80.6°$ and a M. P. 148–150° C. (No depression of the melting point results when this material is admixed with an authentic sample of l-amidone-d-tartrate.) Upon heating the l-amidone-d-tartrate with aqueous alkali, there is obtained about 1.08 g. of substantially pure l-amidone; M. P. 98–100° C.; overall yield from dl-amidone 83% of theory.

Modifications may be made in carrying out the present invention without departing from the spirit and scope thereof, and the invention is to be limited only by the appended claims.

We claim:

1. A salt of d-amidone with an optically-active acid selected from the group which consists of α-bromocamphor-π-sulfonic acid and p-nitrobenzoyl-L-glutamic acid.

2. d-Amidone α-bromocamphor-π-sulfonate.

3. d-Amidone p-nitrobenzoyl-L-glutamate.

4. In the process of resolving the isomers of dl-amidone wherein substantially all of the d-amidone is first separated from the racemic mixture in the form of its salt with an optically-active acid and wherein the residual l-amidone is recovered in substantially pure form by fractional crystallization of l-amidone-d-tartrate, the step of separating said d-amidone from said mixture which comprises reacting a racemate, selected from the group consisting of dl-amidone and salts thereof, with an optically-active acid compound selected from the group consisting of α-bromocamphor-π-sulfonic acid, p-nitrobenzoyl-L-glutamic acid and salts thereof, said reaction being carried out by heating said racemate and said optically-active acid compound together in solution in a lower aliphatic alcohol, thereby forming a solution containing the salts of d-amidone and l-amidone with the optically-active acid, cooling the resulting solution thereby precipitating the sparingly soluble salt of d-amidone with said optically-active acid, and filtering said precipitated salt.

5. The process which comprises reacting dl-amidone hydrochloride with ammonium α-bromocamphor-π-sulfonate, said reaction being carried out by heating the reactants together in a medium comprising aqueous ethanol, thereby producing an ethanolic solution containing d-amidone α-bromocamphor-π-sulfonate and l-amidone α-bromocamphor-π-sulfonate, cooling the resulting solution and adding water to the cooled solution thereby precipitating the sparingly-soluble d-amidone α-bromocamphor-π-sulfonate, and filtering the resulting slurry thereby recovering said d-amidone α-bromocamphor-π-sulfonate.

6. The process which comprises reacting dl-amidone with p-nitrobenzoyl-L-glutamic acid, said reaction being carried out by heating the reactants together in a medium comprising butanol, thereby producing a butanolic solution containing the salts of d-amidone and l-amidone with p-nitrobenzoyl-L-glutamic acid, cooling the resulting solution and adding petroleum ether to the cooled solution thereby precipitating the sparingly-soluble d-amidone p-nitrobenzoyl-L-glutamate, and filtering said precipitated d-amidone p-nitrobenzoyl-L-glutamate.

EUGENE E. HOWE.
MAX TISHLER.

References Cited in the file of this patent

FOREIGN PATENTS

| Number | Country | Date |
|---|---|---|
| 61,463 | Denmark | Oct. 25, 1943 |

OTHER REFERENCES

Kleiderer, "P. B. 981," July 1945, pp. 96–100.

Thorp et al. (1) "Nature," vol. 159, pp. 679–680 (May 1947).

Brode et al., "J. Org. Chem.," vol. 13, pp. 191–193 (September 1947).

Thorp et al. (2), "Nature," vol. 160, pp. 605–606 (November 1947).

Gilman, "Organic Chemistry," (Wiley, New York, 1938) vol. 1, pp. 189–193.

Winter, "J. Am. Chem. Soc.," vol. 62, pp. 3266–3267 (1940).